United States Patent
Kim et al.

(10) Patent No.: US 9,276,253 B2
(45) Date of Patent: Mar. 1, 2016

(54) NEGATIVE ELECTRODE WITH FLUORINATED ACRYLATE POLYMER COATING LAYER, AND LITHIUM BATTERY

(75) Inventors: Gue-sung Kim, Yongin-si (KR); Moon-Seok Kwon, Hwaseong-si (KR); Han-su Kim, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 605 days.

(21) Appl. No.: 13/206,811

(22) Filed: Aug. 10, 2011

(65) Prior Publication Data
US 2012/0183852 A1  Jul. 19, 2012

(30) Foreign Application Priority Data
Jan. 17, 2011 (KR) .................. 10-2011-0004529

(51) Int. Cl.
| | |
|---|---|
| *H01M 4/62* | (2006.01) |
| *H01M 4/04* | (2006.01) |
| *H01M 4/36* | (2006.01) |
| *H01M 4/133* | (2010.01) |
| *H01M 4/134* | (2010.01) |
| *H01M 4/1393* | (2010.01) |
| *H01M 4/1395* | (2010.01) |
| *H01M 10/0525* | (2010.01) |

(52) U.S. Cl.
CPC ............ *H01M 4/0416* (2013.01); *H01M 4/133* (2013.01); *H01M 4/134* (2013.01); *H01M 4/1393* (2013.01); *H01M 4/1395* (2013.01); *H01M 4/366* (2013.01); *H01M 4/623* (2013.01); *H01M 4/628* (2013.01); *H01M 10/0525* (2013.01); *Y02E 60/122* (2013.01)

(58) Field of Classification Search
CPC ...... H01M 4/628; H01M 4/623; H01M 4/366
USPC .................................................. 429/209, 217
See application file for complete search history.

(56) References Cited

U.S. PATENT DOCUMENTS

| | | | |
|---|---|---|---|
| 7,700,226 B2 | 4/2010 | Yong et al. | |
| 2004/0018430 A1* | 1/2004 | Holman et al. ............... | 429/233 |
| 2004/0115523 A1* | 6/2004 | Hommura et al. ............ | 429/144 |
| 2005/0118508 A1* | 6/2005 | Yong et al. .................... | 429/246 |
| 2008/0003506 A1 | 1/2008 | Suzuki et al. | |
| 2010/0176337 A1 | 7/2010 | Zhamu et al. | |

FOREIGN PATENT DOCUMENTS

| | | |
|---|---|---|
| JP | 5-182687 | 7/1993 |
| JP | 2002-042819 A | 2/2002 |
| JP | 2002042819 A * | 2/2002 |
| KR | 10-2001-0095827 | 11/2001 |

(Continued)

OTHER PUBLICATIONS

Extended European Search Report for Application No. 12150415.3-1227 dated May 4, 2012.

(Continued)

*Primary Examiner* — Zachary Best
(74) *Attorney, Agent, or Firm* — Cantor Colburn LLP

(57) ABSTRACT

A negative electrode including: a current collector; a negative active material layer formed on the current collector; and a polymer coating layer that is formed on the negative active material layer and comprises a fluorinated acrylate type polymer.

10 Claims, 2 Drawing Sheets

(56) References Cited

FOREIGN PATENT DOCUMENTS

| | | |
|---|---|---|
| KR | 10-2005-0043674 | 5/2005 |
| WO | 2005/050762 A1 | 6/2005 |

OTHER PUBLICATIONS

Chinese Office Action with English Translation for Application No. 201210014718.7 dated Mar. 2, 2015.

* cited by examiner

NEGATIVE ELECTRODE WITH FLUORINATED ACRYLATE POLYMER COATING LAYER, AND LITHIUM BATTERY

CROSS-REFERENCE TO RELATED APPLICATION

This application claims the benefit of Korean Patent Application No. 10-2011-0004529, filed on Jan. 17, 2011 in the Korean Intellectual Property Office, the disclosure of which is incorporated herein in its entirety by reference.

BACKGROUND

1. Field

Aspects of the present disclosure relate to negative electrodes, negative active materials, methods of preparing the negative electrodes, and lithium batteries including the negative electrodes, and more particularly, to negative electrodes with high charge and discharge efficiency and good cycle characteristics, negative active materials, methods of preparing the negative electrodes, and lithium batteries including the negative electrodes.

2. Description of the Related Art

Lithium batteries are rechargeable at high rates, and have an energy density per unit three times greater than those of conventional lead storage batteries, nickel-cadmium batteries, nickel-hydrogen batteries, nickel-zinc batteries, etc. Since lithium batteries operate at high operating voltages, they are not used together with an aqueous electrolyte solution that is highly reactive to lithium. In general, lithium batteries include an organic electrolyte solution. The organic electrolyte solution is prepared by dissolving a lithium salt in an organic solvent. An organic solvent that is suitable for preparing the organic electrolyte solution may be any one of various solvents that are stable at high voltage and have high ion conductivity, a high dielectric rate, and low viscosity.

If a lithium battery includes a polar carbonate-based and non-aqueous solvent, excess charges are used due to a side reaction between a carbon electrode that is a negative electrode and an electrolyte solution during initial charging, which is an irreversible reaction. Due to the irreversible reaction, a passivation layer such as a solid electrolyte interface (SEI) is formed on the surface of the negative electrode.

During charging and discharging, the SEI prevents decomposition of the electrolyte solution and performs as an ion tunnel. During charging and discharging, the SEI allows only lithium ions to pass therethrough, and blocks flow of the organic solvent moving together with lithium ions in the electrolyte solution.

Only lithium ions are intercalated in the carbon electrode that is a negative electrode and the organic solvent is not cointercalated with the lithium ions, thereby preventing collapsing of the structure of the negative electrode. In general, an additive, such as vinylene carbonate or vinylene sulfate, is used in an electrolyte solution of a lithium battery in order to form a high-quality SEI on the surface of the negative electrode, and the use of the additives leads to higher capacity retention rate, better cycle characteristics, and higher stability of the lithium battery.

However, the greater surface area of the carbon electrode that is a negative electrode and the smaller carbon particle size, for example, a nanoparticle size, bring about more side reactions between the carbon electrode that is a negative electrode and the electrolyte solution and thus, the SEI is not formed. Thus, high capacity retention rate and good cycle characteristics of a lithium battery may not be obtained only by using the additives of the lithium battery.

SUMMARY

Aspects of the present invention provide negative electrodes having good capacity retention rate characteristics and good cycle characteristics.

Aspects of the present invention provide negative active materials having good capacity retention rate characteristics and good cycle characteristics.

Aspects of the present invention provide methods of preparing the negative electrodes.

Aspects of the present invention provide lithium batteries including the negative electrodes.

According to an aspect of the present invention, a negative electrode includes a current collector; a negative active material layer formed on the current collector; and a polymer coating layer that is formed on the negative active material layer and includes a fluorinated acrylate type polymer.

According to another aspect of the present invention, a negative active material includes a core that intercalates or deintercalates lithium, and a coating layer formed on at least a portion of the core, wherein the core includes at least one material selected from the group consisting of a carbonaceous negative active material and a metal-based negative active material, and the coating layer includes a fluorinated acrylate type polymer.

According to another aspect of the present invention, a method of preparing a negative electrode includes: preparing a negative active material composition by mixing a negative active material, a conductive agent, a binder, and a solvent; forming a negative active material layer by coating a current collector with the negative active material composition; and forming a polymer coating layer including a fluorinated acrylate type polymer on the negative active material layer by coating the negative active material layer with a solution including the fluorinated acrylate type monomer and having a viscosity of about 0.5 cP to about 1000 cP and polymerizing the fluorinated acrylate type monomer.

According to another aspect of the present invention, a lithium battery includes: a positive electrode; the negative electrode as described above; and an electrolyte.

Additional aspects and or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
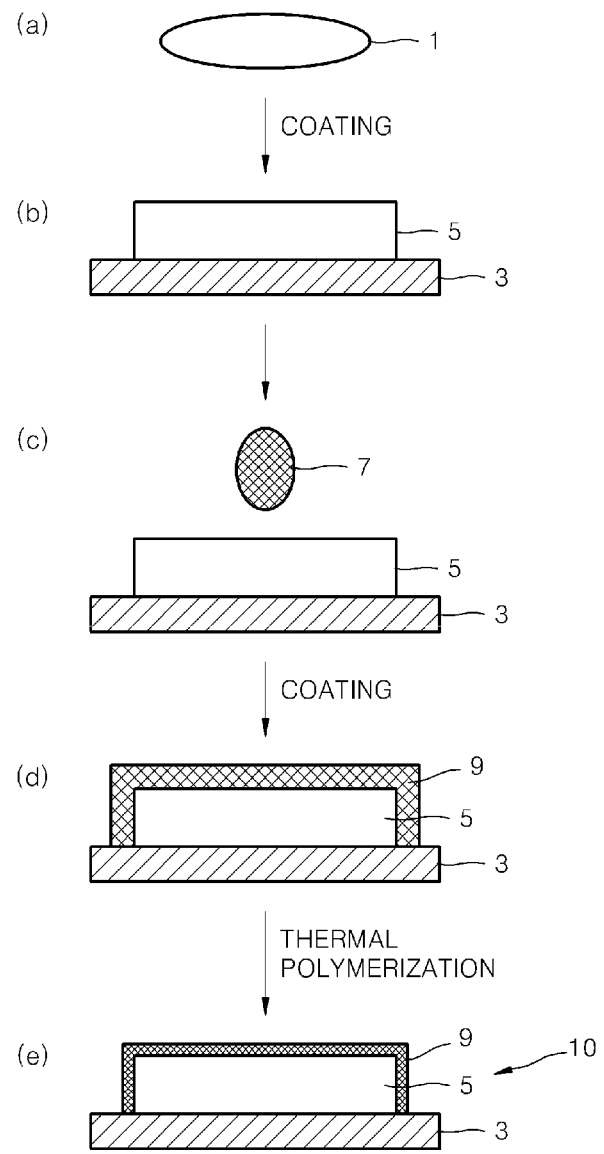
FIG. 1 is a schematic view to explain a method of preparing a negative electrode according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a negative electrode, a negative active material, a method of preparing the negative electrode, and a lithium battery including the negative electrode, according to embodiments of the present invention, will be described in detail. However, the embodiments presented herein are exemplary and the present invention is not limited thereto and is defined only by the claims.

A negative electrode according to an embodiment of the present invention includes a current collector; a negative active material layer formed on the current collector; and a polymer coating layer formed on the negative active material layer, wherein the polymer coating layer may include a fluorinated acrylate type polymer.

The fluorinated acrylate type polymer refers to a polymer compound having the structure of an acrylate type polymer having a fluoride as a substituent.

The polymer coating layer formed on the negative active material layer has a high mechanical strength due to combining of $F^-$ of the fluorinated acrylate type polymer and $H^+$ present at a surface of the negative active material layer. Also, the polymer coating layer may have high flexibility due to the inclusion of the fluorinated acrylate type polymer.

The fluorinated acrylate type polymer may include a repeating unit represented by Formula 1 below.

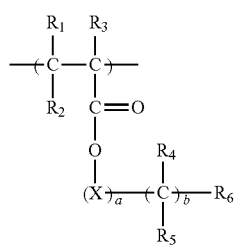

<Formula 1> where $R_1$ to $R_3$ may each be independently a hydrogen atom, a fluorine atom, a $C_1$ to $C_{20}$ alkyl group, a fluorine atom-substituted $C_1$ to $C_{20}$ alkyl group, a $C_2$ to $C_{20}$ alkenyl group, a fluorine atom-substituted $C_2$ to $C_{20}$ alkenyl group, a $C_6$ to $C_{20}$ aryl group, or a fluorine atom-substituted $C_6$ to $C_{20}$ aryl group;

$R_4$ to $R_6$ may each be independently a hydrogen atom, a fluorine atom, $CH_3$, $CHF_2$, $CH_2F$, or $CF_3$;

X is $CH_2$, CHF, or $CF_2$; and a is an integer of 0 to 10, and b is an integer of 0 to 10, wherein a weight average molecular weight of the fluorinated acrylate type polymer may be about 200 to about 500,000, for example, about 5,000 to about 300,000, and for example, about 10,000 to about 200,000, and any one of $R_1$ to $R_6$ may include at least one fluorine atom.

Examples of the $C_1$ to $C_{20}$ alkyl group used in Formula 1 are methyl, ethyl, propyl, isobutyl, sec-butyl, ter-butyl, neobutyl, iso-amyl, and hexyl.

Examples of the $C_2$ to $C_{20}$ alkenyl group used in Formula 1 are vinylene, and allylene.

Examples of the $C_6$ to $C_{30}$ aryl group used in Formula 1 are phenyl, naphthyl, and tetrahydronaphthyl.

Due to the fluorinated acrylate type polymer, the polymer coating layer formed on the negative active material layer has high mechanical strength. Thus, a lithium battery including the negative electrode including the polymer coating layer has a high capacity retention rate and good cycle characteristics.

The fluorinated acrylate type polymer may be a fluorinated (meth)acrylate-based polymer.

The fluorinated (meth)acrylate-based polymer may be a fluorinated acrylate-based polymer, or a fluorinated methcrylate polymer.

Nonlimiting examples of the fluorinated acrylate type polymer include poly(2,2,2-trifluoroethyl(meth)acrylate), poly(2,2,3,3-tetrafluoropropyl(meth)acrylate), poly(2,2,3,3,3-pentafluoropropyl(meth)acrylate), poly(2,2,3,4,4,4-hexafluorobutyl(meth)acrylate), poly(2,2,3,3,4,4,4-heptafluorobutyl(meth)acrylate), poly(2,2,3,3,4,4,5,5-octafluoropentyl(meth)acrylate) (or poly(1H,1H,5H-octafluoropentyl(meth)acrylate)), poly(3,3,4,4,5,5,6,6,6-nonafluorohexyl(meth)acrylate), poly(1,1,1,3,3,3-hexafluoroisopropyl(meth)acrylate), and a combination thereof. For example, the fluorinated acrylate type polymer may be poly(2,2,2-trifluoroethyl methacrylate), poly(2,2,3,3,3-pentafluoropropyl methacrylate), or poly(2,2,3,3,4,4,5,5-octafluoropentyl methacrylate) (or poly(1H,1H,5H-octafluoropentyl methacrylate)).

A polymerization method for obtaining the fluorinated acrylate type polymer may not be limited. For example, the fluorinated acrylate type polymer may be formed by thermally polymerizing a fluorinated acrylate type monomer represented by Formula 3 below or irradiating an active ray, such as ultraviolet light, to a fluorinated acrylate type monomer represented by Formula 3 below.

The fluorinated acrylate type polymer may further include a repeating unit represented by Formula 2 below and in this case, the fluorinated acrylate type polymer is referred to as a copolymer:

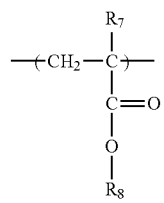

<Formula 2> where $R_7$ is H, or $CH_3$, and $R_8$ is a linear or branched $C_1$ to $C_9$ alkyl group, wherein a weight average molecular weight of the copolymer is about 200 to about 500,000, for example, about 5,000 to about 300,000, for example, about 10,000 to about 200,000.

That is, the fluorinated acrylate type polymer may be a copolymer represented by Formula 5.

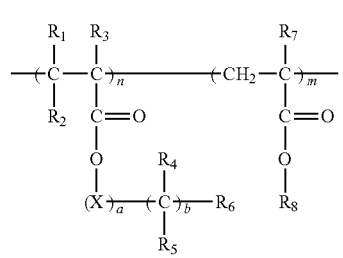

<Formula 5> where $R_1$ to $R_6$, X, a, and b are already defined in connection with Formula 1;

$R_7$ and $R_8$ are already defined in connection with Formula 2; and n:m may have a ratio ranging from about 0.6:0.4 to about 1:0, for example, a ratio ranging from about 0.7:0.3 to about 0.9:0.1, wherein any one of $R_1$ to $R_6$ includes at least one fluorine atom.

The ratio of the repeating units of the copolymer may differ according to the degree of formation of the polymer coating layer.

If the ratio of the fluorinated acrylate type copolymer is within the ranges described above, the polymer coating layer including the fluorinated acrylate type copolymer has high mechanical strength and high elasticity.

Accordingly, the polymer coating layer including the fluorinated acrylate type polymer may prevent a side reaction between the negative electrode and an electrolyte solution, thereby blocking deterioration of lifetime, and a lithium battery including the negative electrode may have better lifetime characteristics.

An amount of the fluorinated acrylate type polymer may be about 0.0001 to about 3 parts by weight, for example, about 0.001 to about 3 parts by weight, based on 100 parts by weight of the negative active material layer.

If the amount of the fluorinated acrylate type polymer is within the ranges described above, the polymer coating layer is formed on the negative active material layer by thermal treatment so that direct contact between the negative electrode and an electrolyte solution may be reduced during charging and discharging and a side reaction between the negative electrode and an electrolyte solution is blocked. Thus, a lithium battery having good battery characteristics may be effectively manufactured.

That is, the negative active material layer has a plurality of negative active material particles, and the polymer coating layer may form a cross-link between adjacent negative active material particles.

Accordingly, since the polymer coating layer may be maintained even at a high temperature of about 300° C. or higher and direct contact between the negative electrode and an electrolyte solution is reduced, battery characteristics, such as lifetime characteristics and cycle characteristics, may be improved.

A specific surface area of the negative active material layer may be about 0.4 to about 150 m²/g, for example, about 0.5 to about 50 m²/g.

If a lithium battery includes a negative electrode including a negative active material layer having the specific surface area ranges described above, the formation of the polymer coating layer may be more effective in obtaining better battery characteristics.

An average diameter of the negative active material particles may be about 20 nm to about 2 μm, for example, about 20 nm to about 1μ. If the average diameter of the negative active material particles is within the ranges described above, the particle size is small and thus the interval between particles is wide, thereby enabling manufacturing of a battery having high-rate characteristics, such as high charge and discharge efficiency.

Also, the negative active material may swell by intercalation of lithium ions during charging. For example, a volumetric expansion rate of the negative active material is about 10% to about 400%. The volumetric expansion rate of the negative active material may be calculated according to Equation 1.

Volumetric Expansion Rate of Negative Active Material(%)=[volume of negative active material during charging once to 10 times]/[volume of negative active material of novel electrode(volume of negative active material during discharging once to 10 times)]×100      <Equation 1>

For example, the negative active material may include inorganic particles, such as silicon or tin, and the volume of the negative active material may increase up to 300 to 400% of its original volume.

However, lithium titanium oxides have a very small volumetric rate and thus are not included in the volumetric expansion range described above.

The negative active material layer may further include a conductive agent and a binder.

A negative active material according to an embodiment of the present invention includes a core that intercalates or deintercalates lithium, and a coating layer formed on at least a portion of the core, wherein the core may include at least one material selected from the group consisting of a carbonaceous negative active material and a metal-based negative active material, and the coating layer may include a fluorinated acrylate type polymer.

The fluorinated acrylate type polymer may include, for example, a repeating unit represented by Formula 1 below:

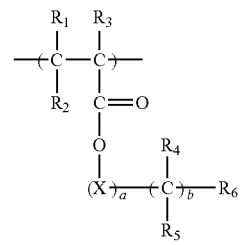

<Formula 1> where $R_1$ to $R_3$ may each be independently a hydrogen atom, a fluorine atom, a $C_1$ to $C_{20}$ alkyl group, a fluorine atom-substituted $C_1$ to $C_{20}$ alkyl group, a $C_2$ to $C_{20}$ alkenyl group, a fluorine atom-substituted $C_2$ to $C_{20}$ alkenyl group, a $C_6$ to $C_{20}$ aryl group, or a fluorine atom-substituted $C_6$ to $C_{20}$ aryl group;

$R_4$ to $R_6$ may each be independently a hydrogen atom, a fluorine atom, $CH_3$, $CHF_2$, $CH_2F$, or $CF_3$;

X is $CH_2$, CHF, or $CF_2$; and a is an integer of 0 to 10, and b is an integer of 0 to 10, wherein a weight average molecular weight of the fluorinated acrylate type polymer may be about 200 to about 500,000, for example, about 5,000 to about 300,000, and for example, about 10,000 to about 200,000, and any one of $R_1$ to $R_6$ may include at least one fluorine atom.

The fluorinated acrylate type polymer may include, for example, at least one selected from the group consisting of poly(2,2,2-trifluoroethyl(meth)acrylate), poly(2,2,3,3-tetrafluoropropyl(meth)acrylate), poly(2,2,3,3,3-pentafluoropropyl(meth)acrylate), poly(2,2,3,4,4,4-hexafluorobutyl(meth)acrylate), poly(2,2,3,3,4,4,4-heptafluorobutyl (meth)acrylate), poly(2,2,3,3,4,4,5,5-octafluoropentyl(meth)acrylate), poly(3,3,4,4,5,5,6,6,6-nonafluorohexyl(meth)acrylate) and poly(1,1,1,3,3,3-hexafluoroisopropyl(meth)acrylate).

The fluorinated acrylate type polymer may further include a repeating unit represented by Formula 2 below and in this case, the fluorinated acrylate type polymer is referred to as a copolymer:

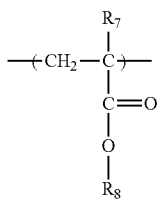

<Formula 2> where $R_7$ is H, or $CH_3$, and $R_8$ is a linear or branched $C_1$ to $C_9$ alkyl group, wherein a weight average molecular weight of the copolymer is about 200 to about 500,000, for example, about 5,000 to about 300,000, for example, about 10,000 to about 200,000.

If the coating layer including the fluorinated acrylate type polymer is formed on at least a portion of the core, internal stress may be reduced even when the volume of the core increases or decreases and direct contact between the core and the electrolyte solution is reduced, thereby preventing separation of the negative active material from the negative electrode current collector. Thus, characteristics of a lithium battery, for example, cycle characteristics of a lithium battery, may be improved.

A method of preparing a negative electrode according to an embodiment of the present invention includes preparing a negative active material composition by mixing a negative active material, a conductive agent, a binder, and a solvent; forming a negative active material layer by coating a current collector with the negative active material composition; and forming a polymer coating layer including a fluorinated acrylate type polymer on the negative active material layer by coating the negative active material layer with a solution including the fluorinated acrylate type monomer and having a viscosity of about 0.5 cP to about 1000 cP and polymerizing the fluorinated acrylate type monomer.

FIG. 1 is a schematic view to explain a method of preparing a negative electrode according to an embodiment of the present invention. Referring to FIG. 1, a negative active material composition 1 is prepared by mixing a negative active material, a conductive agent, a binder, and a solvent (operation (a)).

The negative active material may be a carbonaceous negative active material, metal-based negative active material, or a mixture thereof. The negative active material may be, for example, natural graphite, a silicon/carbon composite ($SiO_x$), silicon metal, silicon thin film, lithium metal, lithium alloy, carbonaceous material, or graphite.

The conductive agent provides conductivity to the negative electrode and may be any one of various materials that conduct electrons and do not cause any chemical change in a battery to be formed. The conductive agent may include at least one material selected from the group consisting of natural graphite, artificial graphite, carbon black, acetylene black, ketjen black, carbon fiber, copper powder or fiber, nickel powder or fiber, aluminum powder or fiber, silver powder or fiber, and a polyphenylene derivative.

The binder may allow negative active material particles to be attached to each other and the negative active material to be attached to the current collector. Nonlimiting examples of the binder include polyvinylalcohol, carboxymethylcellulose, hydroxypropylcellulose, diacetylcellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and a mixture thereof.

In this regard, amounts of the negative active material, the conductive agent, and the binder may be at the equivalent levels as used in a conventional lithium battery. For example, a mixed weight ratio of the negative active material to the mixture of the conductive agent and the binder may be about 98:2 to about 92:8, and is not limited thereto, and a mixed weight ratio of the conductive agent and the binder may be about 1:1.5 to about 1:3, and is not limited thereto.

The negative active material composition 1 is coated on a copper current collector 3 and dried to form a negative active material layer 5 (operation (b)).

Alternatively, the negative active material composition 1 is cast on a separate support and a negative active material film separated from the support is laminated on a copper current collector 3.

The negative active material layer 5 may be formed on the copper current collector 3 by coating with a doctor blade. In this case, any coating method may be available as long as the coating method does not adversely affect properties of the negative active material. Examples of the coating method include spray coating, immersion, etc.

Then, a solution 7 including a fluorinated acrylate type monomer and having a viscosity of about 0.5 cP to about 1000 cP is prepared (operation (c)), and the solution 7 is coated on the negative active material layer 5 (operation (d)).

The fluorinated acrylate type monomer may include a monomer represented by Formula 3:

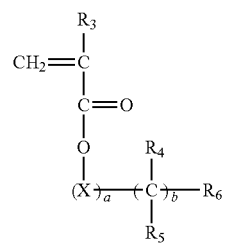

<Formula 3> where $R_3$ is a hydrogen atom, a fluorine atom, a $C_1$ to $C_{20}$ alkyl group, a fluorine atom-substituted $C_1$ to $C_{20}$ alkyl group, a $C_2$ to $C_{20}$ alkenyl group, a fluorine atom-substituted $C_2$ to $C_{20}$ alkenyl group, a $C_6$ to $C_{20}$ aryl group, or a fluorine atom-substituted $C_6$ to $C_{20}$ aryl group;

$R_4$ to $R_6$ are each independently a hydrogen atom, a fluorine atom, $CH_3$, $CHF_2$, $CH_2F$, or $CF_3$;

X is $CH_2$, CHF, or $CF_2$; and a is an integer of 0 to 10, and b is an integer of 0 to 10, wherein a weight average molecular weight of the fluorinated acrylate type monomer may be about 200 to about 500,000, for example, about 5,000 to about 300,000, for example, about 10,000 to about 200,000, and any one of $R_3$ to $R_6$ may include at least one fluorine atom.

The $C_1$ to $C_{20}$ alkyl group, the $C_2$ to $C_{20}$ alkenyl group, and the $C_6$ to $C_{30}$ aryl group used in Formula 1 are already described above.

Nonlimiting examples of the fluorinated acrylate type monomer include 2,2,2-trifluoroethyl(meth)acrylate, 2,2,3,3-tetrafluoropropyl(meth)acrylate, 2,2,3,3,3-pentafluoropropyl(meth)acrylate, 2,2,3,4,4,4-hexafluorobutyl(meth)acrylate, 2,2,3,3,4,4,4-heptafluorobutyl (meth)acrylate, 2,2,3,3,4, 4,5,5-octafluoropentyl(meth)acrylate (or 1H,1H,5H-octafluoropentyl(meth)acrylate), 3,3,4,4,5,5,6,6,6-nonafluorohexyl(meth)acrylate, and a mixture thereof. For example, the fluorinated acrylate type monomer may include 2,2,2-trifluoroethyl methacrylate, 2,2,3,3,3-pentafluoropropyl methacrylate, or 2,2,3,3,4,4,5,5-octafluoropentyl methacrylate (or 1H,1H,5H-octafluoropentyl methacrylate).

The fluorinated acrylate type monomer may further include, for example, a fluorinated acrylate type monomer represented by Formula 4 below, and a mixed ratio of the monomer represented by Formula 3 to the monomer represented by Formula 4 may range from about 0.6:0.4 to about 1:0.

<Formula 4>

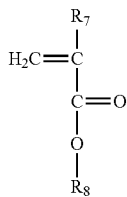

where $R_7$ is H or $CH_3$, and $R_8$ is a linear or branched $C_1$ to $C_9$ alkyl group; and a weight average molecular weight of a copolymer obtained by polymerizing the fluorinated acrylate type monomers represented by Formulae 3 and 4 is about 200 to about 500,000, for example, about 5,000 to about 300,000, and for example, about 10,000 to about 200,000.

Also, the viscosity of the solution may be about 0.5 cP to about 1000 cP, for example, about 1 cP to about 200 cP. If the viscosity of the solution is within the ranges described above, the solution has fluidity and flowability. Thus, the solution fills pores of the negative electrode and a surface of the negative electrode is impregnated with the solution, thereby enabling formation of a uniform coating layer and, after drying, a coating layer with fewer cracks and craters.

Then, the fluorinated acrylate type monomer is dried by thermal polymerization to form a polymer coating layer 9 including the fluorinated acrylate type polymer on the negative active material layer 5 (operation (e)).

The fluorinated acrylate type polymer may include, for example, a repeating unit represented by Formula 1 below:

<Formula 1>

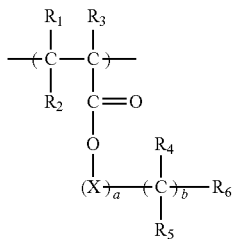

where $R_1$ to $R_3$ may each be independently a hydrogen atom, a fluorine atom, a $C_1$ to $C_{20}$ alkyl group, a fluorine atom-substituted $C_1$ to $C_{20}$ alkyl group, a $C_2$ to $C_{20}$ alkenyl group, a fluorine atom-substituted $C_2$ to $C_{20}$ alkenyl group, a $C_6$ to $C_{20}$ aryl group, or a fluorine atom-substituted $C_6$ to $C_{20}$ aryl group;

$R_4$ to $R_6$ may each be independently a hydrogen atom, a fluorine atom, $CH_3$, $CHF_2$, $CH_2F$, or $CF_3$;

X is $CH_2$, CHF, or $CF_2$; and a is an integer of 0 to 10, and b is an integer of 0 to 10, wherein a weight average molecular weight of the fluorinated acrylate type polymer may be about 200 to about 500,000, for example, about 5,000 to about 300,000, and for example, about 10,000 to about 200,000, and any one of $R_1$ to $R_6$ may include at least one fluorine atom.

The $C_1$ to $C_{20}$ alkyl group, the $C_2$ to $C_{20}$ alkenyl group, and the $C_6$ to $C_{30}$ aryl group used in Formula 1 are already described above.

In order to polymerize the fluorinated acrylate type monomer, heating or irradiation of an active ray may be used. The active ray may be, for example, an ultraviolet (UV) ray, an electron ray, or an X-ray.

When the fluorinated acrylate type monomer is polymerized, a polymerization initiator may be further used. Nonlimiting examples of a polymerization initiator include: a thermal polymerization initiator, such as azoisobisbutyronitrile, benzoyl peroxide, acetyl peroxide, or lauroyl peroxide; a light polymerization initiator, such as ethylbenzoin ether, isopropylbenzoin ether, α-methylbenzoin ethylether, benzoin phenylether, α-acyloxime ester, α,α-diethoxy acetophenone, 1,1-dichloro acetophenone, 2-hydroxy-2-methyl-1-phenyl-propane-1-one, 1-hydroxy cyclohexyl phenyl ketone, anthraquinone, 2-anthraquinone, 2-chloroanthraquinone, thioxanthone, isopropyl thioxanthone, chlorothioxanthone, benzophenone, ρ-chlorobenzophenone, benzyl benzoate, benzoyl benzoate, or Michler's ketone, and a mixture thereof.

An amount of the polymerization initiator may be about 0.1 wt. % to about 5 wt. %, for example, about 0.5 wt. % to about 3 wt. %, based on the weight of the fluorinated acrylate type monomer.

If the fluorinated acrylate type monomer is thermally polymerized to form the polymer coating layer 9, heating may be performed under vacuum conditions. The vacuum heating may be performed at a temperature of about 80 to about 300° C. for about 1 hour to 3 hours. For example, the vacuum heating may be performed at a temperature of about 100 to about 120° C. for 2 hours.

A concentration of the fluorinated acrylate type monomer in the solution 7 may be about 0.5 to about 3 wt. %.

By controlling the concentration of the fluorinated acrylate type monomer to be within the range described above, the degree of forming the polymer coating layer 9, that is, the amount or thickness of the polymer coating layer 9 may be adjusted.

A lithium battery according to an embodiment of the present invention includes a positive electrode; the negative electrode as described above; and an electrolyte.

The lithium battery including the negative electrode as described above may have improved battery characteristics, such as capacity retention rate characteristics and cycle characteristics.

The positive electrode may include a current collector and a positive active material layer.

The current collector may include aluminum (Al) or copper (Cu), and is not limited thereto.

The positive active material layer may include a positive active material, a binder, and a conductive agent of which use is optional.

The positive active material may include a compound that reversibly intercalates or deintercalates lithium, that is, a lithiated intercalation compound. The compound may be a compound represented by any one of the following formulae:

$Li_aA_{1-b}X_bD_2$ where $0.95 \le a \le 1.1$, and $0 \le b \le 0.5$; $Li_aE_{1-b}X_bO_{2-c}D_c$ where $0.95 \le a \le 1.1$, $0 \le b \le 0.5$, $0 \le c \le 0.05$; $LiE_{2-b}X_bO_{4-c}D_c$ where $0 \le b \le 0.5$, $0 \le c \le 0.05$; $Li_aNi_{1-b-c}Co_bB_cD_\alpha$ where $0.95 \le a \le 1.1$, $0 \le b \le 0.5$, $0 \le c \le 0.05$, $0 \le \alpha \le 2$; $Li_aNi_{1-b-c}Co_bX_cO_{2-\alpha}M_\alpha$ where $0.95 \le a \le 1.1$, $0 \le b \le 0.5$, $0 \le c \le 0.05$, $0 \le \alpha \le 2$; $Li_aNi_{1-b-c}Co_bX_cO_{2-\alpha}M_2$ where $0.95 \le a \le 1.1$, $0 \le b \le 0.5$, $0 \le c \le 0.05$, $0 \le \alpha \le 2$; $Li_aNi_{1-b-c}Mn_bX_cD_\alpha$ where $0.95 \le a \le 1.1$, $0 \le b \le 0.5$, $0 \le c \le 0.05$, $0 \le \alpha \le 2$; $Li_aNi_{1-b-c}Mn_bX_cO_{2-\alpha}M_\alpha$ where $0.95 \le a \le 1.1$, $0 \le b \le 0.5$, $0 \le c \le 0.05$, $0 \le \alpha \le 2$; $Li_aNi_{1-b-c}Mn_bX_cO_{2-\alpha}M_2$ where $0.95 \le a \le 1.1$, $0 \le b \le 0.5$, $0 \le c \le 0.05$, $0 \le \alpha \le 2$; $Li_aNi_bE_cG_dO_2$ where $0.90 \le a \le 1.1$, $0 \le b \le 0.9$, $0 \le c \le 0.5$, $0.001 \le d \le 0.1$; $Li_aNi_bCo_cMn_dG_eO_2$ where $0.90 \le a \le 1.1$, $0 \le b \le 0.9$, $0 \le c \le 0.5$, $0 \le d \le 0.5$, $0 \le e \le 0.1$; $Li_aNiG_bO_2$ where $0.90 \le a \le 1.1$, $0.001 \le b \le 0.1$; $Li_aCoG_bO_2$ where $0.90 \le a \le 1.1$, $0.001 \le b \le 0.1$; $Li_aMnG_bO_2$ where $0.90 \le a \le 1.1$, $0.001 \le b \le 0.1$; $Li_aMn_2G_bO_4$ where $0.90 \le a \le 1.1$, $0 \le b \le 0.1$; $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $LiFePO_4$; and lithium titanate ($Li_4Ti_5O_{12}$).

For example, the positive active material may be $LiMn_2O_4$, $LiNi_2O_4$, $LiCoO_2$, $LiNiO_2$, $LiMnO_2$, $Li_2MnO_3$, $LiFePO_4$, or $LiNi_xCo_yO_2$ ($0 \le x \le 0.15$, $0 \le y \le 0.85$).

In the formulae as described above, A is selected from the group consisting of Ni, Co, Mn, and a combination thereof; X is selected from the group consisting of Al, Ni, Co, Mn, Cr, Fe, Mg, Sr, V, a rare-earth element, and a combination thereof; D is selected from the group consisting of O, F, S, P, and a combination thereof; E is selected from the group consisting of Co, Mn, and a combination thereof; M is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; J is selected from the group consisting of V, Cr, Mn, Co, Ni, Cu, and a combination thereof, and are not limited thereto.

The binder may allow positive active material particles to be attached to each other and the positive active material to be attached to the current collector. Nonlimiting examples of the binder include polyvinylalcohol, carboxymethylcellulose, hydroxypropylcellulose, diacetylcellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and a mixture thereof. The conductive agent provides conductivity to the positive electrode and may be any one of various materials that conduct electrons and do not cause any chemical change in a battery to be formed. The conductive agent may include at least one material selected from the group consisting of natural graphite, artificial graphite, carbon black, acetylene black, ketjen black, carbon fiber, copper powder or fiber, nickel powder or fiber, aluminum powder or fiber, silver powder or fiber, and a polyphenylene derivative.

In this case, the amounts of the positive active material, the binder, and the conductive agent may be at the equivalent levels as used in a conventional lithium battery. For example, a weight ratio of the positive active material to the mixture of the conductive agent and the binder is 98:2 to 92:8, and is not limited thereto, and a mixed weight ratio of the conductive agent to the binder may be about 1:1.5 to about 1:3, and is not limited thereto. In order to form the positive active material layer, the positive active material and the binder (optionally, the conductive agent may be included) are mixed in a solvent to prepare a positive active material composition, and the positive active material composition is coated on the current collector. This method of forming a positive electrode is obvious in the art and thus, will not be described in detail.

The solvent is not limited to the following, but may be a chain carbonate, such as dimethyl carbonate, ethylmethyl carbonate, diethyl carbonate, dipropyl carbonate, or a fatty acid ester derivative; a cyclic carbonate, such as, ethylene carbonate, propylene carbonate, butylene carbonate, γ-butyrolactone, or N-methylpyrrolidone; dimethoxyethane or diethoxyethane; acetone; or water.

Each of the positive active material composition and the negative active material composition may further include a plasticizer to form pores in the negative active material layer.

A separator may additionally be present between the positive electrode and the negative electrode.

The separator may be any one of various separators that are used in a conventional lithium battery. The separator may have low resistance to flow of ions of the electrolyte and good electrolyte solution retaining ability. Examples of the separator are glass fiber, polyester, polyethylene, polypropylene, polytetrafluoroethylene (PTFE), and a combination thereof, each of which may be in woven or non-woven form. In detail, if the lithium battery is a lithium ion battery, a windable separator formed of polyethylene or polypropylene may be used; if the lithium battery is a lithium ion polymer battery, and a separator having excellent organic electrolyte solution retaining ability may be used. Manufacturing methods for both will now be described in detail.

That is, a polymer resin, a filler, and a solvent are mixed to prepare a separator composition, and then the separator composition is directly coated and dried on an electrode to form a separator film. Alternatively, the separator composition is cast or dried on a support, and a separator film separated from the support is laminated on an electrode.

The polymer resin may not be limited, and may be any one of various materials used in a binder of an electrode plate. For example, the polymer resin may be a vinylidenefluoride/hexafluoropropylene copolymer, polyvinylidenefluoride, polyacrylonitrile, polymethylmethacrylate, and a mixture thereof. In the case of a vinylidenefluoride/hexafluoropropylene copolymer, the amount of hexafluoropropylene is about 8 to about 25 wt. %.

The separator is disposed between the positive electrode plate and the negative electrode plate to form a battery assembly. The battery assembly is wound or folded and placed in a cylindrical battery case or a rectangular battery case, and an organic electrolyte solution is injected thereto. The lithium battery may further include a polymer electrolyte. In the lithium battery, a monomer for forming a polymer matrix is added to the organic electrolyte solution and is polymerized. Alternatively, a polymer formed by polymerizing the monomer is added to the lithium battery, thereby completing the manufacturing process for the lithium battery.

The polymer formed by polymerizing the monomer may be, for example, polyethylene oxide (PEO), polypropylene oxide (PPO), polyethylene imine (PEI), polyethylene sulphide (PES), or polyvinyl acetate (PVAc), and is not limited thereto.

The lithium battery may be cylindrical, rectangular, coin-shaped, or pouch-shaped. Also, the lithium battery may be a bulky-type battery or a thin film-type battery. Also, the lithium battery may be a primary battery or a secondary battery. For example, the lithium battery may mainly be a large-sized thin-film type lithium battery.

The organic electrolyte solution may include a lithium salt, and a mixed organic solvent including a solvent having a high dielectric constant and a solvent having a low boiling point.

The organic electrolyte solution may further include various additives, such as an agent for preventing overcharging.

A solvent having a high dielectric constant for use in the organic electrolyte solution may be any one of various solvents used in the art, and may be a cyclic carbonate, such as ethylene carbonate, propylene carbonate, or butylene carbonate, or gamma-butyrolactone.

A solvent having a low boiling point for use in the organic electrolyte solution may be any one of various solvents used in the art, and may be a chain-type carbonate, such as dimethyl carbonate, ethylmethyl carbonate, diethyl carbonate, or dipropyl carbonate, dimethoxyethane, diethoxyethane, or an aliphatic ester derivative, and is not limited thereto.

One or more hydrogen atoms present in the solvent having a high dielectric constant and the solvent having a low boiling point may be substituted with a halogen atom. The halogen atom may be fluorine.

A mixed volumetric ratio of the solvent having a high dielectric constant to the solvent having a low boiling point may be about 1:1 to about 1:9. If the mixed volumetric ratio is outside the range described above, discharge capacity characteristics and charge and discharge lifetime characteristics may be degraded.

Also, a lithium salt for use in the organic electrolyte solution may be any one of various materials used in a conventional lithium battery, and may include at least one compound selected from the group consisting of $LiClO_4$, $LiCF_3SO_2$, $LiPF_6$, $LiN(CF_3SO_2)_2$, $LiBF_4$, $LiC(CF_3SO_2)_3$, and $LiN(C_2F_5SO_2)_2$.

A concentration of the lithium salt in the organic electrolyte solution may be about 0.5 to about 2 M. If the concentration of the lithium salt is less than 0.5 M, conductivity of the organic electrolyte solution is decreased and thus performance of the organic electrolyte solution is degraded. On the other hand, if the concentration of the lithium salt is higher than 2.0 M, viscosity of the organic electrolyte solution is increased and thus the mobility of lithium ions is reduced.

One or more embodiments will now be described in further detail with reference to the following examples. These examples are for illustrative purpose only and are not intended to limit the scope of the one or more embodiments.

Preparation of Negative Active Material and Negative Electrode

Example 1

9 g of graphite powder, 0.1 g of 2,2,2-trifluoroethyl methacrylate, and 20 g of a PVdF 5 wt. % solution (solvent: N-methylpyrrolidone) were mixed and the mixture was stirred using a mechanical agitator to prepare a negative active material slurry. By the stirring, a negative active material was formed in which a coating layer of the fluorinated acrylate type polymer was formed on a core of graphite powder.

The negative active material slurry was coated to a thickness of about 200 μm on a copper (Cu) current collector by using a doctor blade, and then dried in air at a temperature of 90° C. for 2 hours, and heated under vacuum conditions at a temperature of 120° C. for 2 hours, thereby forming a negative electrode.

Example 2

A negative active material and a negative electrode were prepared in the same manner as in Example 1, except that 1H,1H,5H-octafluoropentyl methacrylate was prepared instead of 2,2,2-trifluoroethyl methacrylate.

Preparation of Negative Electrode

Example 3

9 g of graphite powder and 20 g of a PVdF 5 wt. % solution (solvent: N-methylpyrrolidone) were mixed and the mixture was stirred using a mechanical agitator to prepare a negative active material slurry. The negative active material slurry was coated to a thickness of about 200 μm on a copper (Cu) current collector by using a doctor blade, and then dried in air at a temperature of 90° C. for 2 hours, and heated under vacuum conditions at a temperature of 120° C. for 2 hours, thereby forming a negative active material layer.

2,2,2-trifluoroethyl methacrylate was mixed with dimethyl carbonate (DMC) and the mixture was stirred for 3 hours to prepare 0.5 wt. % solution. The solution was coated on the negative active material layer in a way that the amount of the solution was 0.20 mL per $cm^2$, and then, the solution was allowed to permeate into the negative active material layer by being placed under vacuum conditions at room temperature, and the dimethyl carbonate solvent was removed therefrom.

Then, the result was dried in a vacuum oven at a temperature of 120° C. for 2 hours to form a negative electrode in which a polymer coating layer of poly(2,2,2-trifluoroethyl methacylate) was formed on the negative active material layer.

Example 4

A negative electrode was prepared in the same manner as in Example 3, except that 1H,1H,5H-octafluoropentyl methacrylate was used instead of 2,2,2-trifluoroethyl methacrylate.

Comparative Example 1

A negative electrode was prepared in the same manner as in Example 3, except that the process for forming a polymer coating layer of poly(2,2,2-trifluoroethyl methacrylate) on the negative active material layer was not performed.

Comparative Example 2

A negative electrode was prepared in the same manner as in Example 3, except that polymethyl methacrylate (PMMA) was used instead of 2,2,2-trifluoroethyl methacrylate.

Comparative Example 3

A negative electrode was prepared in the same manner as in Example 1, except that polymethyl methacrylate (PMMA) was used instead of 2,2,2-trifluoroethyl methacrylate.

Battery Assembling

Example 5

A coin cell was manufactured using the negative electrode prepared according to Example 1, a reference electrode of lithium metal, a PTFE separator, and an electrolyte prepared by dissolving 1.3 M $LiPF_6$ in a mixed solvent including ethylene carbonate (EC) and diethyl carbonate (DEC) (a volumetric ratio of 3:7).

Example 6

A coin cell was manufactured in the same manner as in Example 5, except that the negative electrode prepared according to Example 2 was used instead of the negative electrode prepared according to Example 1.

Example 7

A coin cell was manufactured in the same manner as in Example 5, except that the negative electrode prepared according to Example 3 was used instead of the negative electrode prepared according to Example 1.

Example 8

A coin cell was manufactured in the same manner as in Example 5, except that the negative electrode prepared according to Example 4 was used instead of the negative electrode prepared according to Example 1.

Comparative Example 4

A coin cell was manufactured in the same manner as in Example 5, except that the negative electrode prepared according to Comparative Example 1 was used instead of the negative electrode prepared according to Example 2.

Comparative Example 5

A coin cell was manufactured in the same manner as in Example 5, except that the negative electrode prepared according to Comparative Example 2 was used instead of the negative electrode prepared according to Example 2.

Comparative Example 6

A coin cell was manufactured in the same manner as in Example 5, except that the negative electrode prepared according to Comparative Example 3 was used instead of the negative electrode prepared according to Example 2.

Battery Characteristic Evaluations

Experimental Example 1

Figure 2:
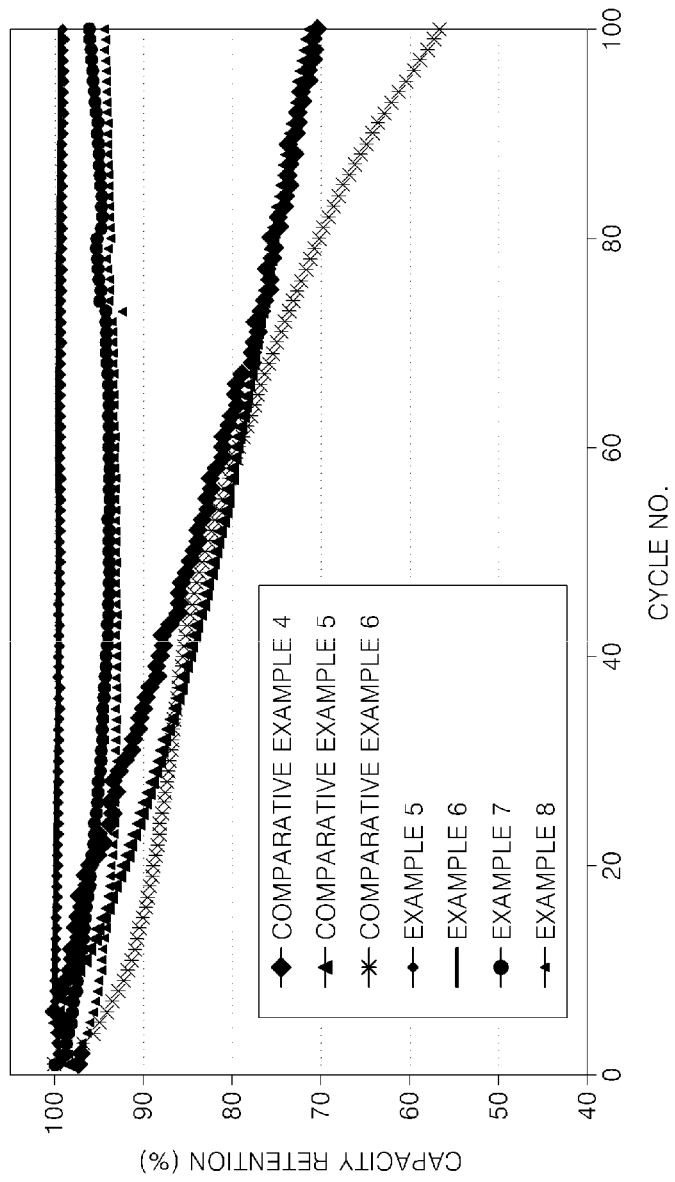
FIG. 2 is a graph showing cycle characteristics of lithium batteries including negative electrodes manufactured according to Examples 5-8 and Comparative Examples 4-6.

The coin cells prepared according to Examples 5, 6, 7, and 8, and Comparative Examples 4, 5, and 6 were charged with a constant current of 175 mA per 1 g of active material until the voltage reached 0.001 V with respect to an Li electrode. Completely charged cells were left for about 10 minutes, and then discharged at a constant current of 175 mA per 1 g of active material until the voltage reached 1.5 V. Charging and discharging were performed a maximum of 100 times in the same method as described above to measure charge and discharge capacity. The results are shown in Table 1 below and FIG. 2. Capacity retention rates and cycle efficiencies were calculated from the charge and discharge capacity.

The capacity retention rates were calculated using Equation 2 below, and cycle efficiency was calculated using Equation 3 below. The capacity retention rate and cycle efficiency of each coin cell in the $100^{th}$ cycle are shown in Table 1.

Capacity retention rate in $100^{th}$ cycle(%)=discharge capacity in $100^{th}$ cycle/discharge capacity in $1^{st}$ cycle  <Equation 2>

Cycle efficiency(%)=discharge capacity in $100^{th}$ cycle/charge capacity in $100^{th}$ cycle  <Equation 3>

TABLE 1

| | Capacity retention rate in $100^{th}$ cycle (%) | Cycle efficiency (%) |
|---|---|---|
| Example 5 | 96.0% | 99.7% |
| Example 6 | 94.4% | 99.7% |
| Example 7 | 99.2% | 99.8% |
| Example 8 | 99.3% | 99.9% |
| Comparative Example 4 | 70.5% | 99.3% |
| Comparative Example 5 | 71.4% | 99.3% |
| Comparative Example 6 | 56.6% | 97.4% |

From the results shown in Table 1, it was confirmed that the coin cells manufactured according to Examples 5 and 6, 7, 8 had higher capacity retention rates in the $100^{th}$ cycle and higher cycle efficiency than those manufactured according to Comparative Examples 4, 5, and 6. The results may be due to the formation of a polymer coating layer including a fluorinated acrylate type polymer on an anode active material and a negative active material layer.

In detail, it is assumed that due to the formation of the polymer coating layer including a fluorinated acrylate type polymer on a negative active material layer, a side reaction between a negative electrode and an electrolyte solution is blocked, and thus, deterioration of lifetime characteristics is prevented, thereby leading higher capacity retention rate and higher cycle efficiency.

As described above, in negative electrodes according to the one or more of the above embodiments of the present invention, due to the formation of a polymer coating layer including a fluorinated acrylate type polymer on a negative active material layer or the inclusion of a negative active material in which a coating layer that intercalates or deintercalates lithium is formed of the fluorinated acrylate type polymer on at least a portion of a core, and therefore direct contact between the negative electrode and an electrolyte solution is reduced. Also, lithium batteries including the negative electrodes have good capacity retention rate characteristics and good cycle characteristics.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A negative electrode comprising:
   a current collector,
      a negative active material layer formed on the current collector; where the negative active material layer comprises a first surface and a second surface; where the first surface and the second surface are oppositely disposed to each other; and where the first surface contacts a surface of the current collector; and
   a polymer coating layer that is formed on the negative active material layer and is a fluorinated acrylate type polymer; where the polymer coating layer comprises a first surface and a second surface that are oppositely disposed to each other; where the first surface of the polymer coating layer contacts the second surface of the negative active material layer; and where the first surface and the second surface of the negative active material layer and the first surface and the second surface of the polymer coating layer are substantially parallel to each other.

2. The negative electrode of claim 1, wherein the fluorinated acrylate type polymer comprises a repeating unit represented by Formula 1:

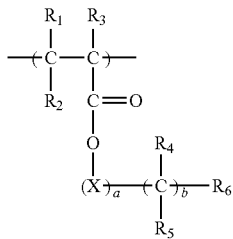

<Formula 1> wherein:
$R_1$ to $R_3$ are each independently a hydrogen atom, a fluorine atom, a $C_1$ to $C_{20}$ alkyl group, a fluorine atom-substituted $C_1$ to $C_{20}$ alkyl group, a $C_2$ to $C_{20}$ alkenyl group, a fluorine atom-substituted $C_2$ to $C_{20}$ alkenyl group, a $C_6$ to $C_{20}$ aryl group, or a fluorine atom-substituted $C_6$ to $C_{20}$ aryl group,
$R_4$ to $R_6$ are each independently a hydrogen atom, a fluorine atom, $CH_3$, $CHF_2$, $CH_2F$, or $CF_3$,
X is $CH_2$, CHF, or $CF_2$,
a is an integer of 0 to 10, and b is an integer of 0 to 10,
the weight average molecular weight of the fluorinated acrylate type polymer is about 200 to about 500,000, and any one of R1 to R6 comprises at least one fluorine atom.

3. The negative electrode of claim 1, wherein the fluorinated acrylate type polymer is at least one material selected from the group consisting of poly(2,2,2-trifluoroethyl(meth)acrylate), poly(2,2,3,3-tetrafluoropropyl(meth)acrylate), poly(2,2,3,3,3-pentafluoropropyl(meth)acrylate), poly(2,2,3,4,4,4-hexafluorobutyl (meth)acrylate), poly(2,2,3,3,4,4,4-heptafluorobutyl (meth)acrylate), poly(2,2,3,3,4,4,5,5-octafluoropentyl(meth)acrylate), poly(3,3,4,4,5,5,6,6,6-nonafluorohexyl(meth)acrylate), and poly(1,1,1,3,3,3-hexafluoroisopropyl(meth)acrylate).

4. The negative electrode of claim 1, wherein the fluorinated acrylate type polymer further includes a repeating unit represented by Formula 2 below:

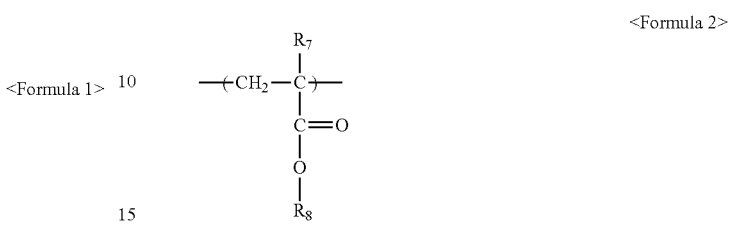

<Formula 2> wherein $R_7$ is H, or $CH_3$, and R is a linear or branched $C_1$ to $C_9$ alkyl group, and
the weight average molecular weight of the fluorinated acrylate type polymer is about 200 to about 500,000.

5. The negative electrode of claim 1, wherein then amount of the fluorinated acrylate type polymer is about 0.0001 to about 3 parts by weight based on 100 parts by weight of the negative active material layer.

6. The negative electrode of claim 1, wherein the negative active material layer has a plurality of negative active material particles, and the polymer coating layer forms a cross-link between adjacent negative active material particles.

7. The negative electrode of claim 6, wherein the average particle size of the negative active material particles is about 20 nm to about 2 μm.

8. The negative electrode of claim 6, wherein the volumetric expansion rate of the negative active material is about 10% to about 400%.

9. The negative electrode of claim 1, wherein the negative active material layer further comprises a conductive agent and a binder.

10. The negative electrode of claim 1, wherein the polymer coating layer is a polymerization product which is derived from a solution having a viscosity of about 0.5 cP to about 1000 cP and comprising a fluorinated acrylate type monomer.

* * * * *